(12) United States Patent
Yamaguchi

(10) Patent No.: US 7,950,301 B2
(45) Date of Patent: May 31, 2011

(54) FEED SCREW MECHANISM

(75) Inventor: Kotaro Yamaguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 559 days.

(21) Appl. No.: 12/075,304

(22) Filed: Mar. 10, 2008

(65) Prior Publication Data

US 2008/0223160 A1 Sep. 18, 2008

(30) Foreign Application Priority Data

Mar. 16, 2007 (JP) ................................ 2007-069068

(51) Int. Cl.
- F16H 3/06 (2006.01)
- F16H 27/02 (2006.01)
- F16H 29/02 (2006.01)
- F16H 29/20 (2006.01)

(52) U.S. Cl. ...................................... 74/89.23; 74/89.34

(58) Field of Classification Search ................. 74/89.23, 74/89.32, 89.33, 424.71, 89.34
See application file for complete search history.

(56) References Cited

U.S. PATENT DOCUMENTS

| | | | |
|---|---|---|---|
| 4,679,451 A * | 7/1987 | Nakamura | 74/606 R |
| 5,918,505 A | 7/1999 | Jensen | |
| 6,067,868 A | 5/2000 | Nakamura et al. | |
| 6,240,797 B1 * | 6/2001 | Morishima et al. | 74/89.39 |
| 7,766,345 B2 * | 8/2010 | Hakui et al. | 280/5.521 |
| 2006/0081078 A1 * | 4/2006 | Nagai et al. | 74/89.23 |
| 2008/0168852 A1 * | 7/2008 | Chen et al. | 74/89.23 |
| 2009/0241706 A1 * | 10/2009 | Yuta et al. | 74/89.23 |

FOREIGN PATENT DOCUMENTS

| | | |
|---|---|---|
| DE | 838009 | 5/1952 |
| JP | 49-007377 | 1/1974 |
| JP | 53-62613 | 6/1978 |
| JP | 62-125952 | 6/1987 |
| JP | 6-47388 | 6/1994 |
| JP | 2005-188574 | 7/2005 |
| WO | WO 96/20361 | 7/1996 |

* cited by examiner

*Primary Examiner* — Justin Krause
(74) *Attorney, Agent, or Firm* — Carrier Blackman & Associates, P.C.; William D. Blackman; Joseph P. Carrier

(57) ABSTRACT

A feed screw mechanism includes internally threaded member fixed within an output rod. The internally threaded member is threadedly engaged with an externally threaded member connected at axially one end in the direction of an axis thereof to a drive source, so that the output rod is moved in a direction of the axis relative to the externally threaded member by the relative rotation of the externally threaded member and the internally threaded member. The internally threaded member is coupled to the output rod at the axially other end in the direction of the axis by a threadedly coupling portion. Therefore, when pulling loads in directions away from each other are applied to the output rod and the externally threaded member, a compression load can be prevented from being applied from the output rod to the internally threaded member.

7 Claims, 10 Drawing Sheets

FIG.8

| | PRESENT INVENTION | PRIOR ART EXAMPLE |
|---|---|---|
| UPON EXPANSION OF ACTUATOR (COMPRESSION FORCE) | (A) OK — Threadedly coupling portion 97; Output rod 33; Load transmitting portion; Application of compression force; Internally threaded member 96; Clip 98; Surface pressure is uniform; Externally threaded member 95; Application of compression force | (C) OK — Output rod 33; Step; Load transmitting portion; Application of compression force; Internally threaded member 96; Locking nut; Surface pressure is uniform; Externally threaded member 95; Application of compression force |
| UPON CONTRACTION OF ACTUATOR (PULLING FORCE) | (B) OK — Threadedly coupling portion 97; Output rod 33; Load transmitting portion; Application of pulling force; Internally threaded member 96; Clip 98; Surface pressure is uniform; Externally threaded member 95; Application of pulling force | (D) NG — Output rod 33; Step; Load transmitting portion; Application of compression force; Internally threaded member 96; Locking nut; Surface pressure is non-uniform; Externally threaded member 95; Application of pulling force |

PRESENT INVENTION

PRIOR ART EXAMPLE

PRESENT INVENTION

PRIOR ART EXAMPLE

FEED SCREW MECHANISM

BACKGROUND OF INVENTION

1. Field of the Invention

The present invention relates to a feed screw mechanism in which an internally threaded member fixed within an output rod is threadedly engaged with an externally threaded member, and one axial end of said externally threaded member is connected to a drive source, so that said output rod is moved relative to said externally threaded member by rotating said externally threaded member relative to said internally threaded member.

2. Description of the Related Art

There is a system known from Japanese Patent Publication No. 6-47388, in which an upper link and a lower link of a suspension device of a vehicle are controlled for expansion and contraction by an actuator, thereby inhibiting variations in camber angle and ground-contact tread with the bumping and rebounding of a wheel to enhance a stabilized steering performance, wherein the actuator is comprised of a feed screw mechanism including an externally threaded member and an internally threaded member which are adapted to be rotated relative to each other by a motor.

In such feed screw mechanism, in many cases, the externally threaded member is formed of iron, and the internally threaded member is formed of bronze or aluminum. A sufficient strength is required for an output rod of the feed screw mechanism and for this reason, it is impossible to form the output rod integrally with the internally threaded member formed of bronze or aluminum. Therefore, it is required that the internally threaded member is accommodated within a hollow output formed of iron to ensure a strength and is integrally fixed to the output rod by a fixing means such as a locking nut.

In such a case, as described in "DETAILED DESCRIPTION OF PREFERRED EMBODIMENT" in this specification, when the conventional actuator has been driven for contraction, a pulling load is applied to the externally threaded member, while a compression load is applied to the internally threaded member. This causes a problem that the transmitted load (the contact surface pressure) on the tooth flanks of the externally threaded member and the internally threaded member is non-uniform in a direction of an axis of the feed screw mechanism, which exerts an adverse influence to the durability and the smooth operation of the feed screw mechanism.

SUMMARY OF THE INVENTION

Accordingly, it is an object of the present invention to ensure that the transmitted load on the tooth flanks of the externally threaded member and the internally threaded member of the feed screw mechanism is uniformalized in the direction of the axis.

In order to achieve the object, according to a first feature of the present invention, there is provided a feed screw mechanism in which an internally threaded member fixed within an output rod is threadedly engaged with an externally threaded member, and one axial end of said externally threaded member is connected to a drive source, so that said output rod is moved relative to said externally threaded member by rotating said externally threaded member relative to said internally threaded member, wherein said internally threaded member is coupled to said output rod by a coupling portion provided at the other axial end of said internally threaded member.

With the above arrangement, in the feed screw mechanism in which the internally threaded member fixed within the output rod is threadedly engaged with the externally threaded member connected at one end thereof to the drive source, so that the output rod is moved relative to the externally threaded member by the relative rotation of the externally threaded member and the internally threaded member, the internally threaded member is coupled to the output rod by a coupling portion provided at the axially other end of the internally threaded member. Therefore, when pulling loads in directions away from each other are applied to the output rod and the externally threaded member, a compression load can be prevented from being applied from the output rod to the internally threaded member. Thus, the pulling loads can be applied to both of the externally threaded member and the internally threaded member, and loads uniform in the direction of the axis can be applied to tooth flanks of both of the threaded members, thereby ensuring the durability and the smooth operation.

According to a second feature of the present invention, in addition to the first feature, there is provided a feed screw mechanism wherein said coupling portion is formed by threadedly meshing external threads formed on an outer periphery of the other axial end of said internally threaded member with internal threads formed on an inner periphery of said output rod.

With the above arrangement, the coupling portion for coupling the internally threaded member and the output rod is comprised of external threads formed on the outer periphery of the axially other end of the internally threaded member and the internal threads formed on the inner periphery of the output rod. Therefore, the internally threaded member and the output rod can be coupled simply and firmly to each other.

According to a third feature of the present invention, in addition to the second feature, there is provided a feed screw mechanism wherein a clip for preventing the loosening of said internally threaded member is mounted between the axially one end of said internally threaded member and said output rod.

With the above arrangement, the clip for preventing the loosening of the internally threaded member is mounted between the axially one end of the internally threaded member and the output rod. Therefore, it is possible to prevent the loosening of the internally threaded member relative to the output rod by the clip, while preventing the transmission of the load between the output rod and the internally threaded member.

A motor 36 in an embodiment corresponds to the drive source of the present invention, and a threadedly coupling potion 97 in the embodiment corresponds to the coupling portion of the present invention.

The above and other objects, features and advantages of the invention will become apparent from the following description of the preferred embodiment taken in conjunction with the accompanying drawings.

BRIEF DESCRIPTION OF THE DRAWINGS

FIGS. 1 to 10B show an embodiment of the present invention.

FIG. 1 is a perspective view of a suspension device for left rear wheel;

FIG. 2 is a view taken in a direction of an arrow 2 in FIG. 1;

FIG. 3 is an enlarged sectional view taken along a line 3-3 in FIG. 1;

FIG. 4 is an enlarged view of an area indicated by 4 in FIG. 3;

FIG. 5 is an enlarged view of an area indicated by 5 in FIG. 3;

FIG. 6 is an exploded perspective view of a decelerator and a coupling;

FIG. 7 is an enlarged sectional view taken along a line 7-7 in FIG. 3;

FIG. 8 is a diagram for comparing the embodiment of the present invention and prior art examples;

FIGS. 10A and 10B are diagrams for explaining the operations of the embodiment of the present invention and prior art example, respectively.

DETAILED DESCRIPTION OF PREFERRED EMBODIMENT

The present invention will now be described by way of an embodiment with reference to the accompanying drawings.

Figure 1:
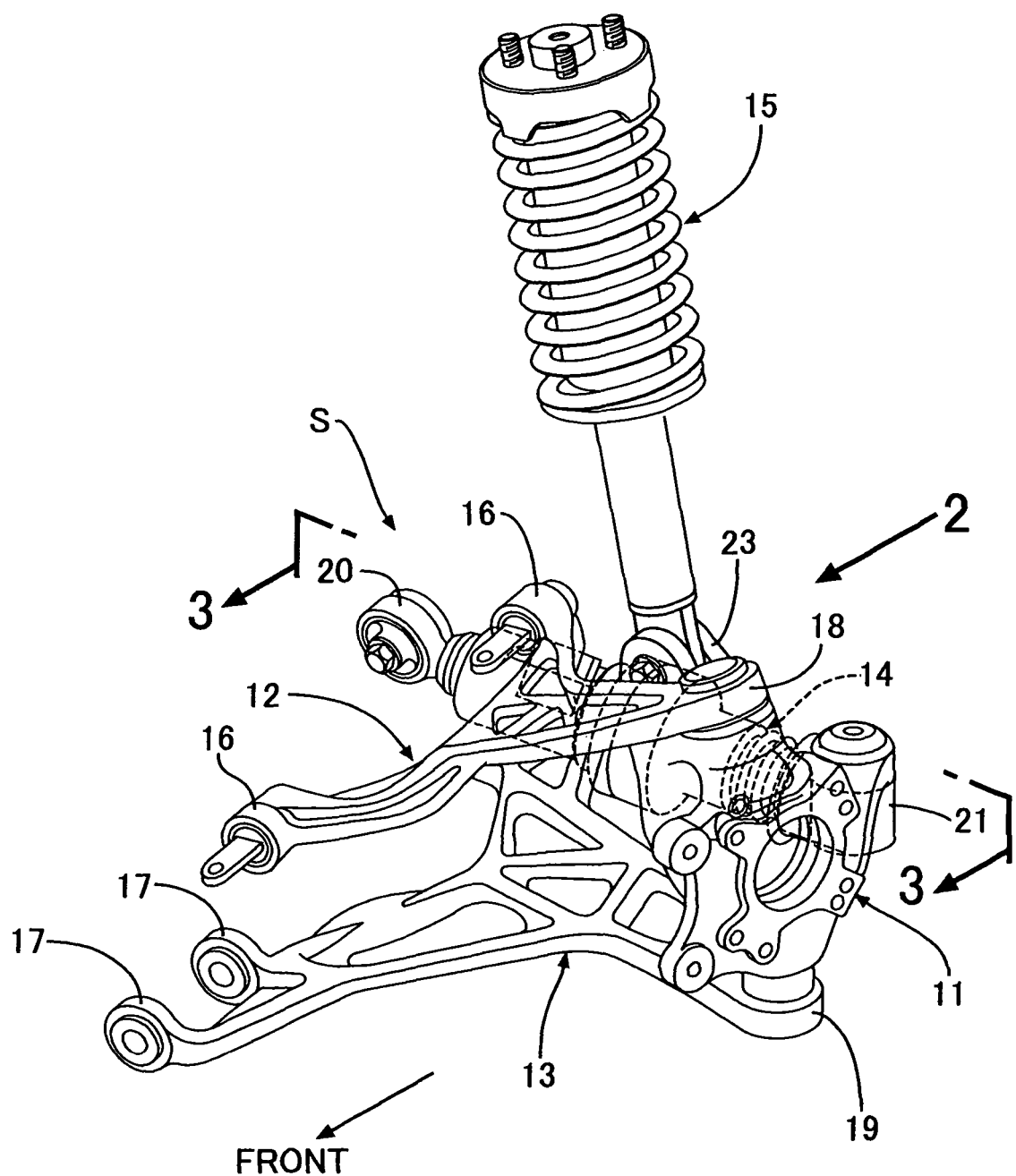
Figure 2:
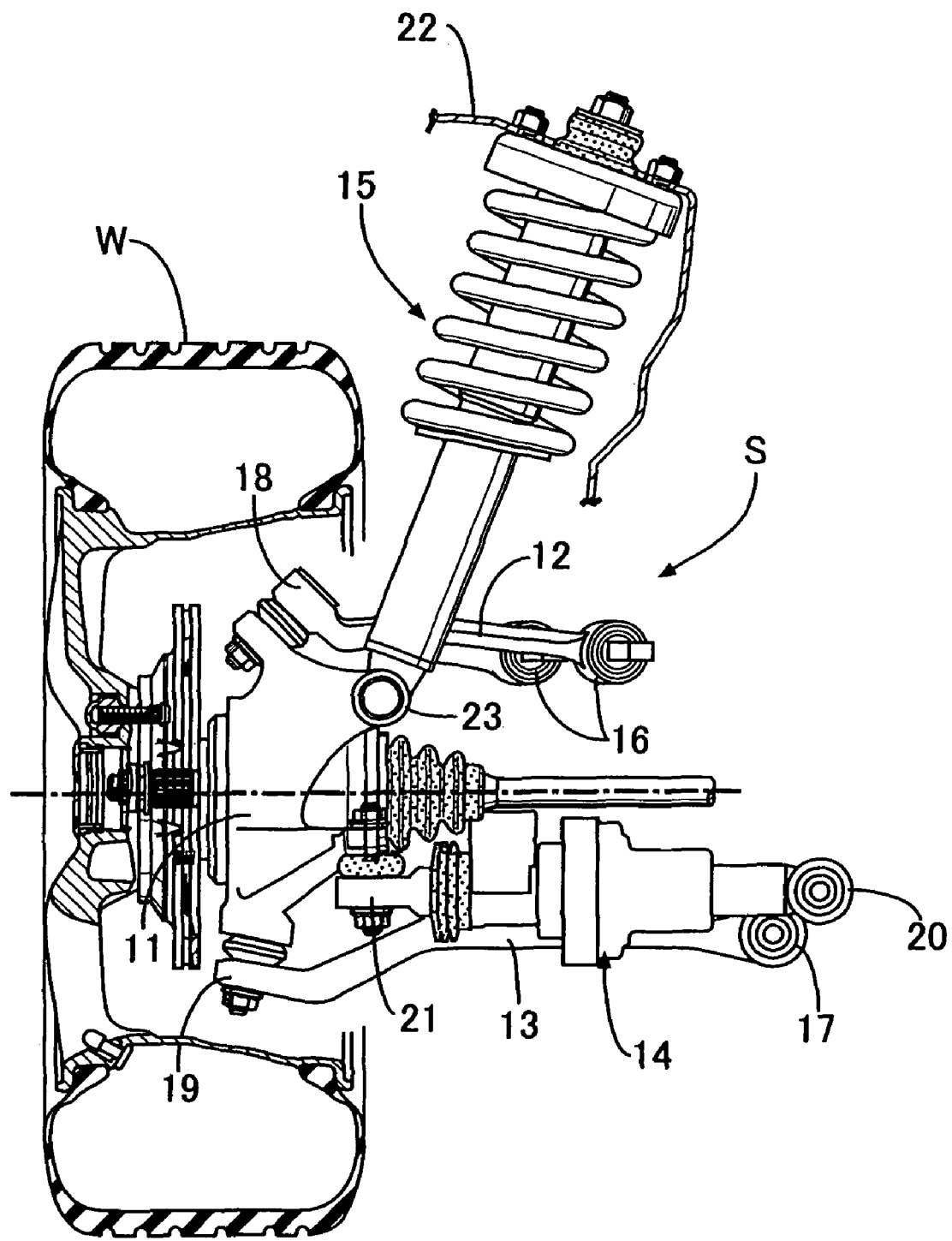

As shown in FIGS. 1 and 2, a double wishbone-type rear suspension S of a four-wheel steering vehicle comprised of a knuckle 11 adapted to rotatably support a rear wheel W, an upper arm 12 and a lower arm 13 which connect the knuckle 11 to a vehicle body for vertical movement, a toe control actuator 14 which connects the knuckle 11 and the vehicle body to control a toe angle of the rear wheel W, a damper 15 having a suspension spring for damping the vertical movement of the rear wheel W, and the like.

Leading ends of the upper arm 12 and the lower arm 13 connected at their base ends to the vehicle body by rubber bush joints 16 and 17, respectively, are connected to upper and lower portions of the knuckle 11 through ball joints 18 and 19, respectively. The toe control actuator 14 is connected at its base end to the vehicle body through a rubber bush joint 20, and at its leading end to a rear portion of the knuckle 11 through a rubber bush joint 21. The damper 15 having the suspension spring and fixed at its upper end to the vehicle body (an upper wall 22 of a suspension tower) is connected at its lower end to the upper portion of the knuckle 11 through a rubber bush joint 23.

When the toe control actuator 14 is driven for expansion, the rear portion of the knuckle 11 is pushed outwards in a direction of a vehicle width, whereby the toe angle of the rear wheel W is changed in a toe-in direction. When the toe control actuator 14 is driven for contraction, the rear portion of the knuckle 11 is pulled inwards in the direction of the vehicle width, whereby the toe angle of the rear wheel W is changed in a toe-out direction. Therefore, it is possible to enhance the straight-travel stabilizing performance and the turning performance of the vehicle by controlling the toe angle of the rear wheel W in accordance with a vehicle speed and a steering angle of a steering wheel in addition to a usual steering of a front wheel by the operation of the steering wheel.

Next, with reference to FIGS. 3 to 7, the structure of the toe control actuator 14 will be described in detail.

Figure 3:
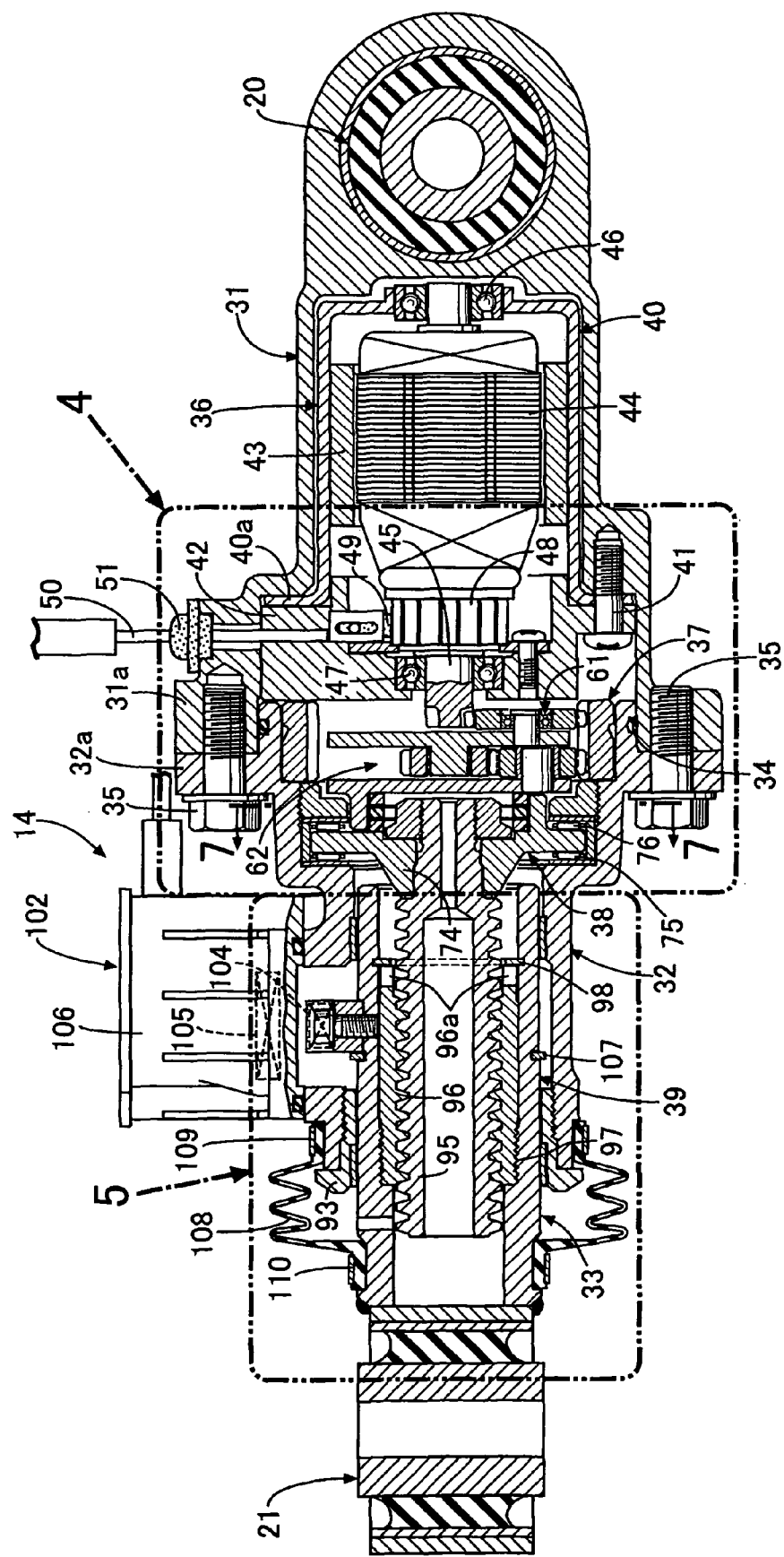
Figure 4:
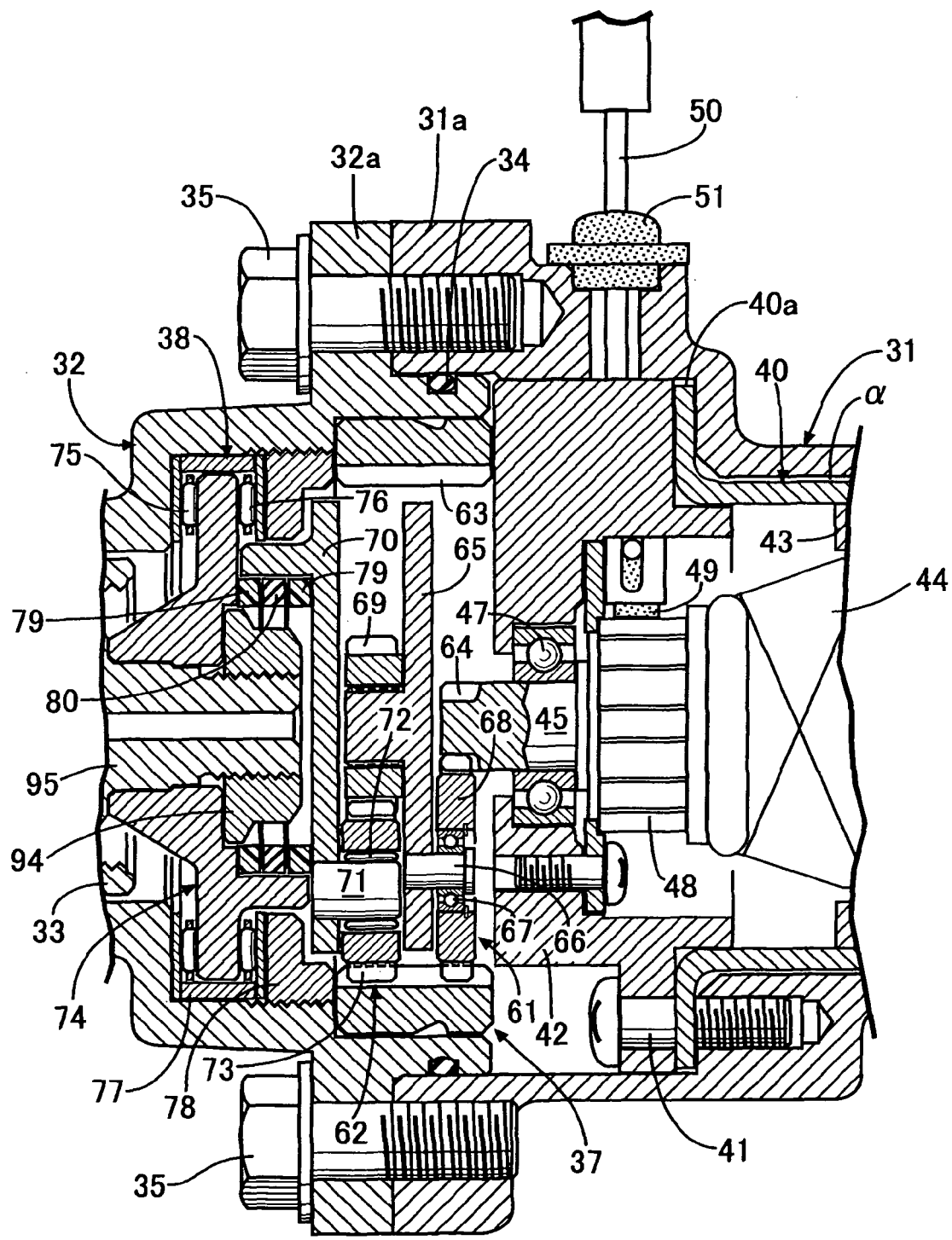

As shown in FIGS. 3 and 4, the toe control actuator 14 includes a first housing 31 integrally provided with the rubber bush joint 20 connected to the vehicle body side, and a second housing 32 which expandably and contractably supports an output rod 33 integrally provided with the rubber bush joint 21 connected to the knuckle 11 side. Opposed portions of the first and second housings 31 and 32 are integrally connected to each other by fastening their coupling flanges 31a and 32a by a plurality of bolts 35 in a state in which the housings 31 and 32 are socket-fitted to each other with a seal member 34 interposed therebetween. A brushed motor 36 serving as a drive source is accommodated within the first housing 31, and a planetary gear-type decelerator 37, a coupling 38 having a resilience, and a feed screw mechanism 39 using a trapezoidal screw are accommodated within the second housing 32.

In this manner, the toe control actuator 14 is constructed by previously sub-assembling the first housing 31 accommodating the motor 36 and the second housing 32 accommodating the decelerator 37, the coupling 38 and the feed screw mechanism 39 and coupling the first housing 31 and the second housing 32 to each other. Therefore, when the motor 36 is changed to a motor generating a larger output or a motor generating a smaller output, or when the operational characteristics of the decelerator 37 and the feed screw mechanism 39 are changed, this can be achieved by exchanging only a subassembly on the side of the first housing or a subassembly on the side of the second housing 32 without changing the design of the entire toe control actuator 14. Thus, it is possible to enhance the general-purpose properties for various types, leading to a reduction in cost.

A contour of the motor 36 is comprised of a yoke 40 formed into a cup-shape and having a flange 40a, and a bearing holder 42 fastened to the flange 40a of the yoke 40 by a plurality of bolts 41. The bolts 41 for fastening the yoke 40 and the bearing holder 42 are threadedly engaged with an end face of the first housing 31, and the motor 36 is fixed to the first housing 31 utilizing the bolts 41.

A rotor 44 disposed within an annular stator 43 supported on an inner peripheral surface of the yoke 40 has a rotary shaft 45 which is rotatably supported at one end thereon on a ball bearing 46 mounted on a bottom of the yoke 40 and which is rotatably supported at the other end thereof on a ball bearing 47 mounted on the bearing holder 42. A brush 49 is supported on an inner surface of the bearing holder 42 to come into sliding contact with a commutator 48 mounted around an outer periphery of the rotary shaft 45. A conductor wire 50 extending from the brush 49 is drawn out to the outside through a grommet 51 mounted n the first housing 31.

The contour of the motor 36 is constituted by the yoke 40 which is a firm part having the stator 43 and the rotor 44 accommodated therein, and the yoke 40 is fixed to the first housing 31. Therefore, a load input to the toe control actuator 14 from the rear wheel W is received by the first housing 31, so that such load is hard to be applied to the motor 36; and thus, it is possible to enhance the durability and reliability of the motor 36. Moreover, a clearance a is formed between the outer peripheral surface of the yoke 40 of the motor 36 and the inner peripheral surface of the first housing 31. Therefore, it is possible not only to inhibit the leakage of a operating sound of the motor 36 to the outside of the first housing 31 by the clearance α, but also to further reliably prevent an external force applied to the first housing 31 from being transmitted to the motor 36.

In addition, the motor 36 is fixed to the first housing 31 utilizing the bolts 41 for integrally fastening the yoke 40 of the motor 36 and the bearing holder 42. Therefore, as compared with a case where the motor 36 is fixed to the first housing 31 by bolts other than the bolts 41, it is possible not only to reduce the number of the bolts, but also to reduce a space for disposition of the other bolts, leading to a reduction in size of the toe control actuator 14.

Figure 5:
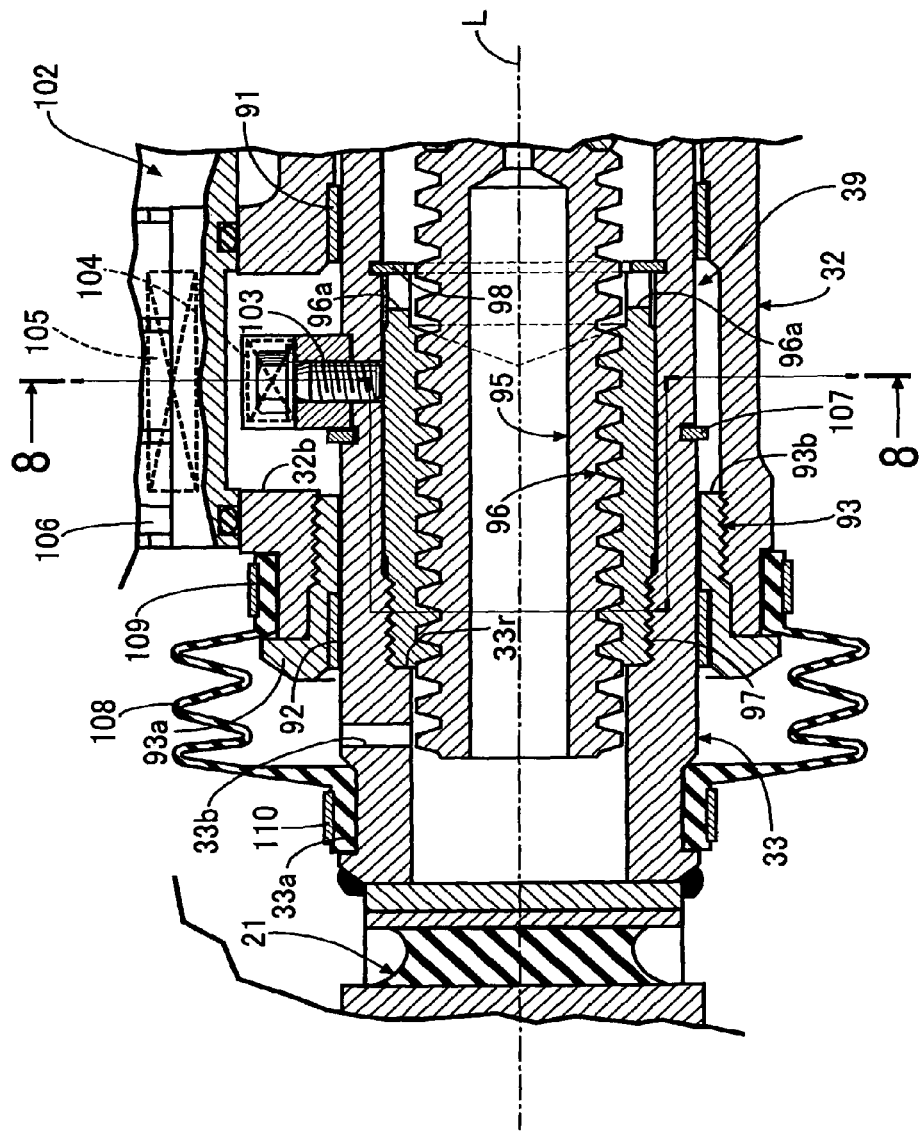

As shown in FIGS. 4 and 5, the decelerator 37 is constituted by coupling a first planetary gear mechanism 61 and a second planetary gear mechanism 62 in two stages. The first planetary gear mechanism 61 is comprised of a ring gear 63 fitted into and fixed in an opening in the second housing 32, a first sun gear 64 formed directly at a leading end of the rotary shaft 45 of the motor 36, a disk-shaped first carrier 65, and four first pinions 68 which are rotatably carried on first pinion pins 66 supported in a cantilever manner by press-fitting into the first carrier 65 with ball bearings 67 interposed therebetween, and which are simultaneously meshed with the ring gear 63 and the first sun gear 64. The first planetary gear mechanism 61 is adapted to decelerate and transmit the rotation of the first sun gear 64 which is an input member to the first carrier 65 which is an output member.

The second planetary gear mechanism 62 of the decelerator 37 is comprised of the ring gear 63 common to the first planetary gear mechanism 61, a second sun gear 69 fixed to the center of the first carrier 65, a disk-shaped second carrier 70, and four second pinions 73 which are rotatably carried on second pinion pins 71 supported in a cantilever manner by press-fitting into the second carrier 70 with slide bushes 72 interposed therebetween, and which are simultaneously meshed with the ring gear 63 and the second sun gear 69. The second planetary gear mechanism 62 is adapted to decelerate and transmit the rotation of the second sun gear 69 which is an input member to the second carrier 70 which is an output member.

In this manner, a large decoration ratio can be obtained by connecting the first and second planetary gear mechanisms 61 and 62 in series, and moreover, it is possible to reduce the size of the decelerator 37. In addition, the sun gear 64 of the first planetary gear mechanism 61 is formed directly on the rotary shaft 45 without being fixed to the rotary shaft 45 of the motor 36. Therefore, as compared with a case where a first sun gear 64 mounted separately from the rotary shaft 45 is employed, it is possible not only to reduce the number of parts, but also to suppress the diameter of the first sun gear 64 to the minimum and to set the deceleration ratio of the first planetary gear mechanism 61 at a larger value.

The second carrier 70 which is the output member of the decelerator 37 is connected an input flange 74 which is an input member of the feed screw mechanism 39 through the coupling 38. The input flange 74 which is generally disk-shaped is rotatably supported with its outer peripheral portion sandwiched between a pair of thrust bearings 75 and 76. More specifically, an annular locking nut 78 is fastened to the inner peripheral surface of the second housing 32 so as to sandwich a spacer collar 77 between them. One of the thrust bearings 75 is disposed to support a thrust load between the second housing 32 and the input flange 74, and the other thrust bearing 76 is disposed to support a thrust load between the locking nut 78 and the input flange 74.

Figure 6:
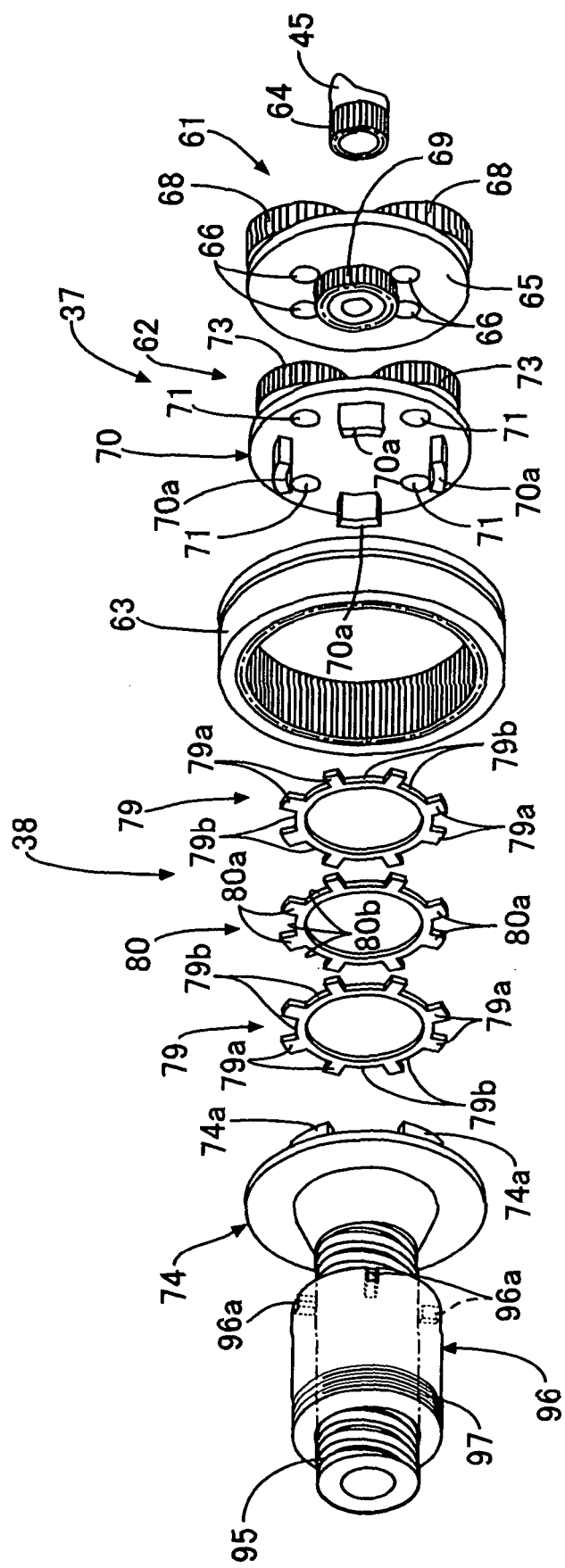
Figure 7:
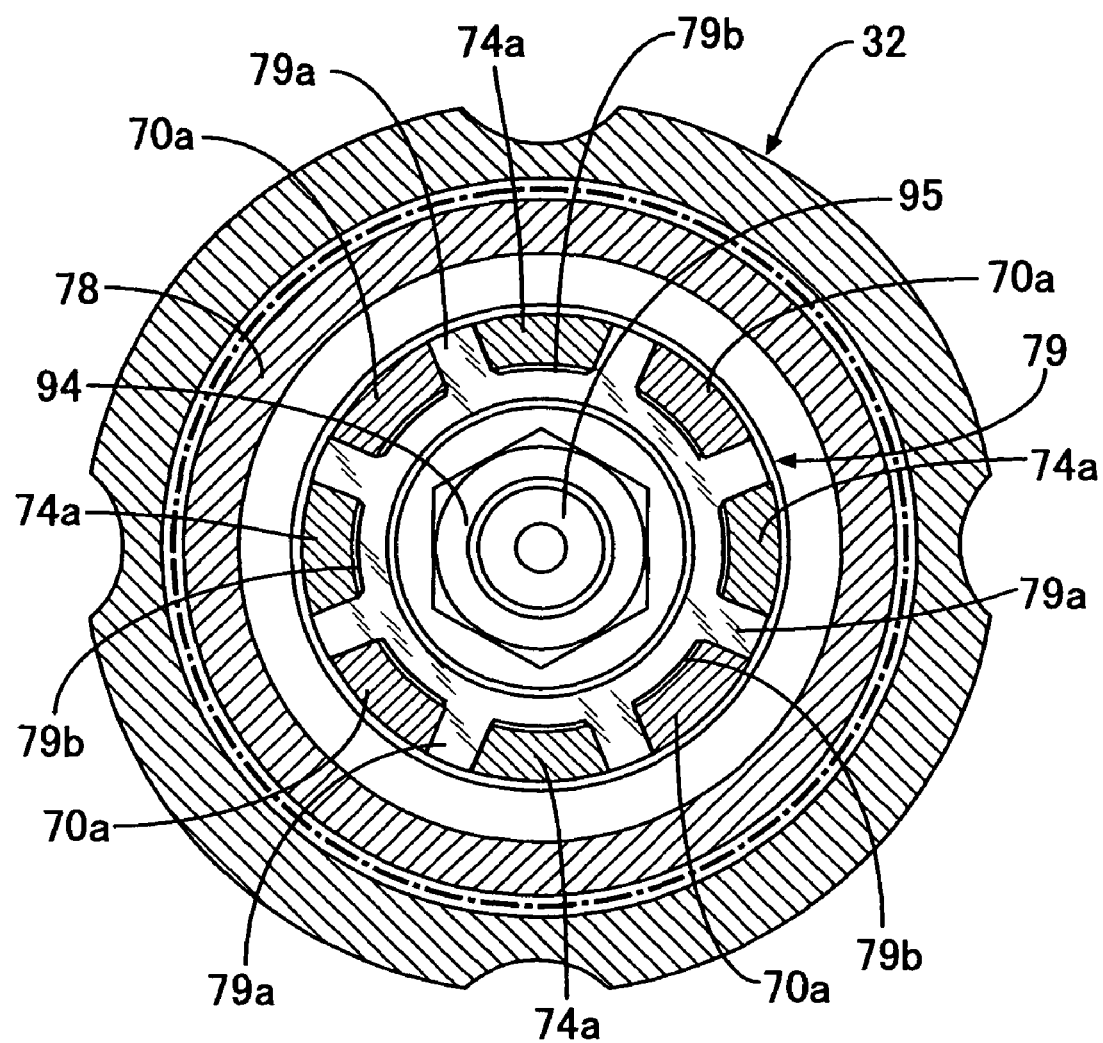

As can be seen from FIGS. 4, 6 and 7, the coupling 38 includes two outer elastic bushes 79, 79 formed of, for example, a polyacetal, a single inner elastic bush 80 formed of, for example, a silicone rubber. Eight projections 79a, 80a and eight grooves 79b, 80b are formed radially at equal distances around each of outer peripheries of the bushes 79, 79 and 80. On the other hand, four claws 70a and four claws 74a are projectingly formed at equal distances on opposed surfaces of the second carrier 70 and the input flange 74 respectively to axially face each other.

The outer elastic bushes 79, 79 and the inner elastic bush 80 are superposed on each other, so that phases of the projections 79a and 80a are matched to each other; and the four claws 70a of the second carrier 70 are brought into engagement with alternate four of the eight grooves 79b, 80b, and the four claws 74a of the input flange 74 are brought into engagement with remaining four of the eight grooves 79b, 80b.

Therefore, a torque of the second carrier 70 is transmitted from the claws 70a of the second carrier 70 to the input flange 74 through the projections 79a and 80a of the outer elastic bushes 79, 79 and the claws 74a of the input flange 74. At this time, the outer elastic bushes 79, 79 and the inner elastic bush 80 formed of an elastomer exhibit an automatic aligning function for absorbing a very small axis-misalignment between the second carrier 70 and the input flange 74, and absorb a sudden change in torque to enable the smooth transmission of a power.

As can be seen from FIGS. 3 and 5, a first slide bearing 91 is fixed to an inner peripheral surface of an axially intermediate portion of the second housing 32, while a second slide bearing 92 is fixed to an inner peripheral surface of an end member 93 threadedly engaged with an axial end of the first housing 32, and the output rod 33 is slidably supported on the first and second slide bearings 91 and 92. The feed screw mechanism 39, which is adapted to convert the rotational motion of the input flange 74 to a thrust motion of the output rod 33, includes an externally threaded member 95 fastened by a nut 94 (see FIG. 4) with its one end in a direction of an axis L (a right end) penetrating the center of the input flange 74. The feed screw mechanism 39 also includes an internally threaded member 96 which is fixed in such a manner that it is threadedly meshed with an outer periphery of the externally threaded member 95, and it is fitted inside of and fixed to an inner peripheral surface of the hollow output rod 33. In the internally threaded member 96, an outer peripheral surface of its other end (a left end) in the direction of the axis L is coupled to the inner peripheral surface of the output rod 33 by a threadedly coupling portion 97, which engages with corresponding female threads formed inside of the output rod 33. As shown best in FIG. 5, a portion of the output rod 33 proximate the coupling portion 97 is stepped inwardly to define an annular restraining portion 33r, which operates as a seat to limit inward movement of the internally threaded member 96 in the output rod 33 during assembly. Notches 96a are formed at one end of the internally threaded member 96 in the direction of the axis L for engagement of a tool for coupling the internally threaded member 96 in the threadedly coupling portion 97. Additionally, a retaining clip 98, for preventing loosening of the internally threaded member 96, is mounted to a slot formed inside of the output rod 33 proximate the outer ends of the notches 96a in the direction of the axis L. By threadedly coupling the internally threaded member 96 and the output rod 33 by the threadedly coupling portion 97, the internally threaded member 96 and the output rod 33 can be coupled easily and firmly to each other. The clip 98 does not have a function for transmitting a load between the output rod 33 and the internally threaded member 96.

In this way, the output rod 33 is supported on the second housing 32 with the plurality of (two in the embodiment) slide bearings 91 and 92 interposed therebetween. Therefore, a diametrical load applied to the output rod 33 can be reliably supported by the second housing 32 to prevent the gouging of the feed screw mechanism 39.

A stroke sensor 102 mounted on the second housing 32 to detect a stroke position of the output rod 33 to feed it back to a control device when controlling the toe control actuator 14 for expansion and contraction includes a detected portion 104 comprising a permanent magnet fixed to the outer peripheral surface of the output rod 33 by a bolt 103, and a sensor body 106 in which detecting portion 105 such as a coil for magnetically detecting the position of the detected portion 104 is accommodated. An axially extending opening 32b is formed in the second housing 32 to avoid that the detected portion 104 interferes with the movement of the output rod 33.

An annular stopper 107 is mounted around the outer periphery of the output rod 33 and is adapted to abut against an abutment surface 93b of the end member 93 when the output rod 33 has been moved in an expanding direction to a limit position. The provision of the stopper 107 ensures that even if the motor 36 is overdriven due to any abnormality, the output rod 33 can be reliably prevented from being dropped off from the second housing 32. In addition, the stopper 107 is disposed utilizing a dead space sandwiched between the first and second slide bearings 91 and 92, and hence, it is possible to reduce the space. Moreover, the second slide bearing 92 is mounted on the end member 93 capable of being separated from the second housing 32 and hence, the output rod 33 having the stopper 107 can be attached to and detached from the second housing 32 without being obstructed by the second slide bearing 92.

In order to prevent the entrance of water and dust into a clearance between the second housing 32 and the output rod 33, opposite ends of a boot 108 are fitted over an annular step 32c formed on the second housing 32 and into an annular groove 33a formed in the output rod 33 and fixed by bands 109 and 110, respectively. At this time, the annular step 32c of the second housing 32 and a flange 93a of the end member 93 cooperate to form an annular groove and hence, it is possible to prevent the drop-off of one end of the boot 108 fixed by the band 109. In addition, the drop-off of the boot 108 is prevented utilizing the flange 93a of the end member 93 and hence, it is only required to provide the annular step 32c without provision of an annular groove in the second housing 32 and thus, the processing or working is easy as compared with a case where an annular groove is formed. Moreover, the annular step 32c having one shoulder rather than two shoulders is reduced in width and hence, the axial dimension of the second housing 32 can be correspondingly reduced.

When the output rod 33 is expanded, the volumes of the internal spaces in the first and second housings 31 and 32 are increased. On the other hand, when the output rod 33 is contracted, the volumes of the internal spaces in the first and second housings 31 and 32 are decreased. Therefore, there is a risk that the pressure in each of the internal spaces is varied to impede the smooth operation of the toe control actuator 14. However, the internal space in the hollow output rod 33 and the internal space in the boot 108 communicate with each other through a ventilation bore 33b formed in the output rod 33 and therefore, the variation in pressure is moderated by the deformation of the boot 108 to enable the smooth operation of the toe control actuator 14.

As shown in FIGS. 8A and 8B, in this embodiment, the internally threaded member 96 supported on the inner periphery of the output rod 33 is fixed by the threadedly coupling portion 97 at the left end in the direction of the axis L (see FIG. 5), whereas as shown in FIGS. 8C and 8D, in the prior art example, the internally threaded member 96 supported on the inner periphery of the output rod 33 is fixed in such a manner that its right end in the direction of the axis L is pushed leftwards by a locking nut threadedly engaged with the output rod 33, and its left end in the direction of the axis L is pushed against the step of the output rod 33.

When the toe control actuator 14 is expanded, the externally threaded member 95 and the output rod 33 are compressed in a direction toward each other by the resulting reaction force (see FIGS. 8A and 8C). In this case, in the embodiment shown in FIG. 8A, a load from the output rod 33 is transmitted through the threadedly coupling portion 97 to the internally threaded member 96 to urge the internally threaded member 96 rightwards to press it against the externally threaded member 95, whereby the compression load is applied to both of the externally threaded member 95 and internally threaded member 96. In the prior art example shown in FIG. 8C, a load from the output rod 33 is transmitted through the step to the internally threaded member 96 to urge the internally threaded member 96 rightwards to press it against the externally threaded member 95, whereby the compression load is applied to both of the externally threaded member 95 and internally threaded member 96.

Namely, when the toe control actuator 14 is expanded, the compression load is applied to both of the externally threaded member 95 and internally threaded member 96 in either of the embodiment and the prior art example, and hence, no difference is generated between the embodiment and the prior art example.

However, when the toe control actuator 14 is contracted, the externally threaded member 95 and the output rod 33 are pulled in directions away from each other by the resulting reaction force (see FIGS. 8B and 8D). In this case, in the embodiment shown in FIG. 8B, a load from the output rod 33 is transmitted through the threadedly coupling portion 97 to the internally threaded member 96 to urge the internally threaded member 96 leftwards to pull externally threaded member 95, whereby a pulling load is applied to both of the externally threaded member 95 and internally threaded member 96. In the prior art example shown in FIG. 8D, a load from the output rod 33 is transmitted through the locking nut to the internally threaded member 96 to urge the internally threaded member 96 leftwards to pull the externally threaded member 95, whereby a compression load is applied to the internally threaded member 96, and a pulling load is applied to the externally threaded member 95.

Namely, when the toe control actuator 14 is contracted, the pulling load is applied to both of the externally threaded member 95 and the internally threaded member 96 in the embodiment, whereas the pulling load is applied to the externally threaded member 95 and the compression load is applied to the internally threaded member 96 in the prior art example, and hence, a difference is generated between the embodiment and the prior art example.

In the cases of FIGS. 8A to 8C, both the loads applied to the externally threaded member 95 and the internally threaded member 96 are the compression loads or the pulling loads and hence, a surface pressure of contact between tooth flanks by which the externally threaded member 95 and the internally threaded member 96 are engaged with each other is generally uniform in the direction of the axis L and thus, an abnormal wearing cannot be generated on the tooth flanks, and a smooth relative rotation cannot be impeded. However, in the case of FIG. 8D, the directions of the loads applied to the externally threaded member 95 and the internally threaded member 96 are different from each other (the compression load and the pulling load). For this reason, there is a problem that a surface pressure of contact between the tooth flanks by which the externally threaded member 95 and the internally threaded member 96 are engaged with each other is non-uniform in the direction of the axis L and thus, an abnormal wearing is generated on the tooth flanks, and a smooth relative rotation is impeded.

Figure 9A:
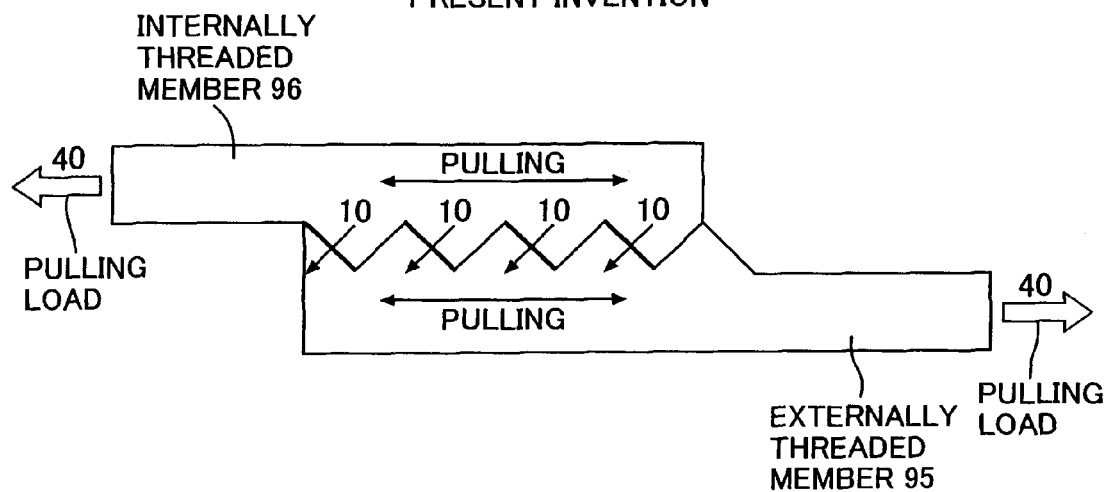
FIGS. 9A and 9B are diagrams of the embodiment of the present invention and prior art example in modeled fashions, respectively.
Figure 9B:
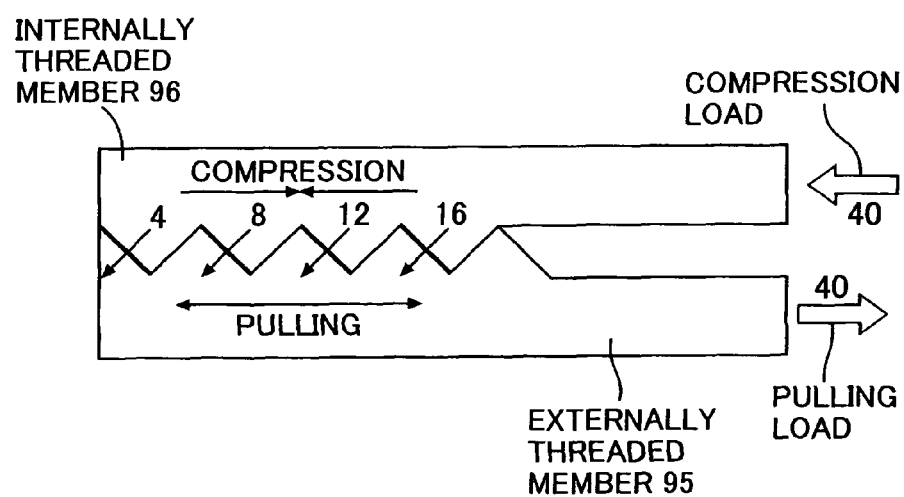

FIG. 9A shows the modeling of the embodiment shown in FIG. 8B. In this case, the internally threaded member 96 is connected at its left end in the direction of the axis L to the output rod 33 by the threadedly coupling portion 97 and hence, a leftward pulling load is applied to the left end. FIG. 9B shows the modeling of the embodiment shown in FIG. 8D. In this case, the internally threaded member 96 is connected at its right end in the direction of the axis L to the output rod 33 by the locking nut and hence, a leftward compression load is applied to such right end.

As shown in FIG. 9A, when a pulling load is applied to both of the externally threaded member 95 and the internally threaded member 96, supposing that the magnitude of the pulling load is 40, four tooth flanks by which the externally threaded member 95 and the internally threaded member 96 are meshed with each other transmit equal loads, respectively. On the other hand, as shown in FIG. 9B, when the pulling load is applied to the externally threaded member 95 and the compression load is applied to the internally threaded member 96, supposing that the magnitude of the pulling (or the compression load) is 40, a load is transmitted more as the tooth flanks meshed on the farther rightward side in the direction of the axis L, and a load is transmitted less as the tooth flanks meshed on the farther leftward side in the direction of the axis.

The reason will be described qualitatively with reference to FIGS. 10A and 10B.

Figure 10A:
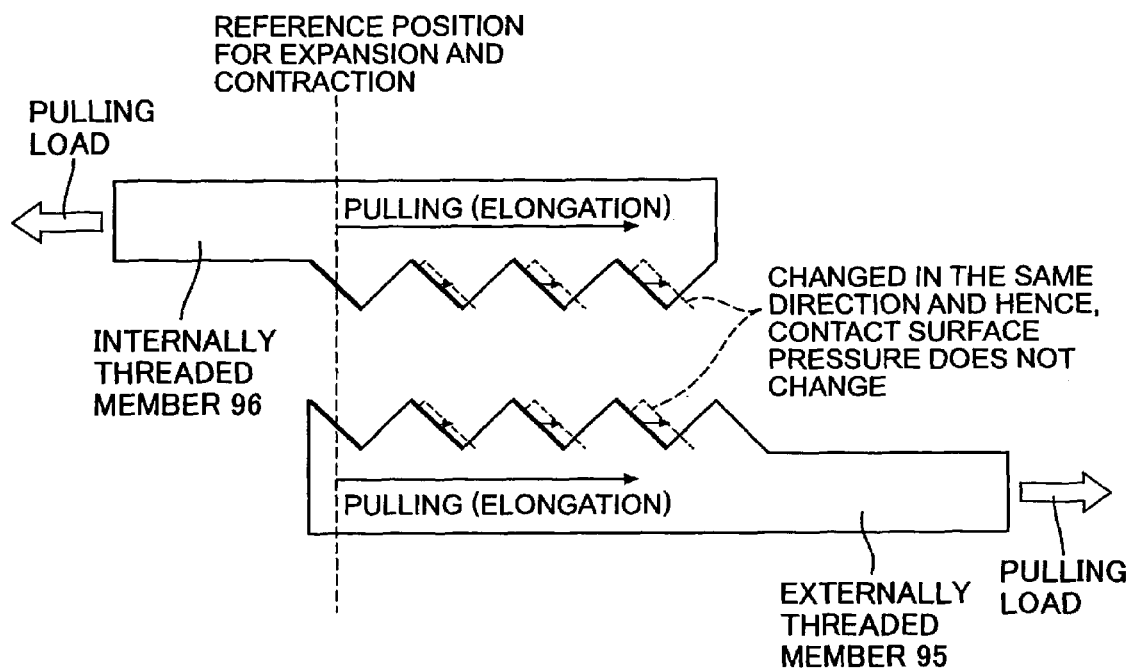

FIG. 10A corresponds to the embodiment. In this case, the pulling load is applied to both of the externally threaded member 95 and the internally threaded member 96 and hence, both of the externally threaded member 95 and the internally threaded member 96 are elastically deformed and elongated.

Here, if the reference for the expansion and the contraction is set at the leftmost tooth flank in the direction of the axis L, the second tooth flank from the left is slightly moved rightwards with the expansion of the externally threaded member 95; the third tooth flank from the left is moved rightwards by a distance slightly larger than that of the second tooth flank; and the fourth tooth flank from the left is moved rightwards by a distance further slightly larger than that of the third tooth flank. Namely, the tooth flank more spaced rightwards apart from the reference position for the expansion and the contraction is moved rightwards by a larger distance based on the integration of the elongations of various portions of the externally threaded member 95 (see broken line). On the other hand, the second tooth flank from the left is slightly moved with the expansion of the internally threaded member 96; the third tooth flank from the left is moved rightwards by a distance slightly larger than that of the second tooth flank; and the fourth tooth flank from the left is moved rightwards by a distance further slightly larger than that of the third tooth flank. Namely, the tooth flank more spaced rightwards apart from the reference position for the expansion and the contraction is moved rightwards by a larger distance based on the integration of the elongations of various portions of the internally threaded member 96 (see broken line).

The moment the load is applied to the externally threaded member 95 and the internally threaded member 96, namely, in a state before the start of the elongative deformation of the externally threaded member 95 and the internally threaded member 96, a load must be dispensed equally to the tooth flanks meshed with each other. If the load is thereafter increased, the elongative deformation of the externally threaded member 95 and the internally threaded member 96 is started, but the tendency of the elongation amount is the same for the corresponding tooth flanks of the externally threaded member 95 and the internally threaded member 96, namely, both of the tooth flanks farther rightwards from the reference position for the expansion and the contraction are displaced largely rightwards, and hence, the surface pressure of contact between any tooth flanks in different positions in the direction of the axis L cannot be increased or decreased. Therefore, it is possible for all the tooth flanks to transmit the load generally equally, and it is possible to prevent both of the generation of an abnormal wear in the tooth flanks and the obstruction of the smooth relative rotation.

Figure 10B:
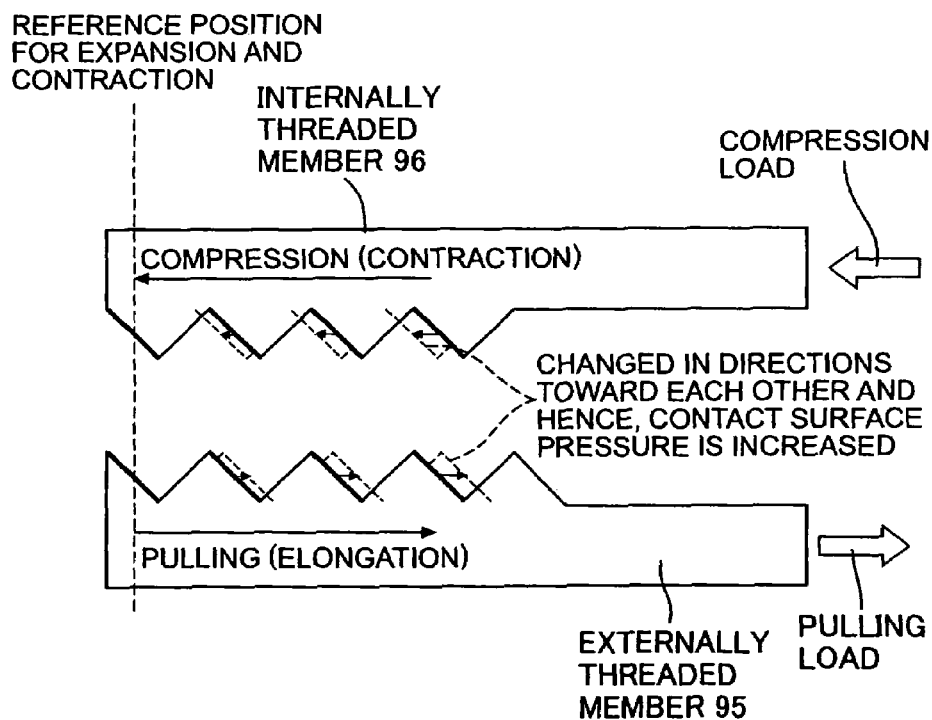

On the contrast, FIG. 10B corresponds to the prior art example. In this case, the externally threaded member 95 is elastically deformed so that it is elongated as a result of the application of a pulling load thereto, and the internally threaded member 96 is elastically deformed so that it is compressed as a result of the application of a compression load thereto.

Here, if a reference for the expansion and the contraction is set at the leftmost tooth flank in the direction of the axis L, the second tooth flank from the left is slightly moved rightwards with the expansion of the externally threaded member 95; the third tooth flank from the left is moved rightwards by a distance slightly larger than that of the second tooth flank; and the fourth tooth flank from the left is moved rightwards by a distance further slightly larger than that of the third tooth flank. Namely, the tooth flank more spaced rightwards apart from the reference position for the expansion and the contraction is moved rightwards by a larger distance based on the integration of the elongations of various portions of the externally threaded member 95. This is the same as in the embodiment described with reference to FIG. 10A.

On the other hand, unlike with the above case, the second tooth flank from the left is slightly moved leftwards with the contraction of the internally threaded member 96; the third tooth flank from the left is moved leftwards by a distance slightly larger than that of the second tooth flank; and the fourth tooth flank from the left is moved leftwards by a distance further slightly larger than that of the third tooth flank. Namely, the tooth flank more spaced rightwards apart from the reference position for the expansion and the contraction is moved leftwards by a larger distance based on the integration of the contractions of various portions of the internally threaded member 96.

The moment a load is applied to the externally threaded member 95 and the internally threaded member 96, namely, in a state before the start of the expansion and contraction deformation of the externally threaded member 95 and the internally threaded member 96, a load must be dispensed equally to the tooth flanks meshed with each other. If the load is thereafter increased, the deformation of the externally threaded member 95 and the internally threaded member 96 is started, but the tooth flanks of the elongated externally threaded member 95 are moved rightwards relative to the reference position for the expansion and the contraction, while the tooth flanks of the contracted internally threaded member 96 are moved leftwards relative to the reference position for the expansion and the contraction, and both of the amounts of such movements are larger for the tooth flanks farther rightwards from the reference position for the expansion and the contraction.

In this way, the corresponding tooth flanks of the externally threaded member 95 and the internally threaded member 96 intend to move in directions toward each other (opposite directions), but in fact, the tooth flanks of the externally threaded member 95 and the tooth flanks of the internally threaded member 96 can not move since they push each other, cannot be moved. By forcibly stopping the tooth flanks intending to move in directions toward each other at their original positions, the surface pressure on the contact surfaces, namely, the transmitted load on the contact surfaces is increased. At this time, the tooth flanks farther rightwards from the reference position for the expansion and the contraction intend to move in a larger amount in directions toward each other, and hence, the contact surface pressure generated by stopping such tooth flanks at their original positions is larger. However, the tooth flanks closer to the reference position for the expansion and the contraction intend to move in a smaller amount in directions toward each other and hence, the contact surface pressure generated by stopping such tooth flanks at their original positions is smaller. As a result, the tooth flanks spaced rightwards apart from the reference position for the expansion and the contraction share the larger load, and the tooth flanks closer rightwards to the reference position for the expansion and the contraction share the smaller load, and the unbalance of the transmitted loads produces problems that an abnormal wear is generated on the tooth flanks, and the smooth relative rotation is impeded.

As described above, according to the present invention, only by modifying the structure for fixing the internally threaded member 96 to the output rod 33, it is possible to prevent the compression load from being applied to the internally threaded member 96 by the application of the pulling load to the externally threaded member 95 during the contraction driving of the toe control actuator 14, and by ensuring that the pulling load is applied to both of the externally threaded member 95 and the internally threaded member 95, the above-described problem can be solved.

Although the embodiment of the present invention has been described in detail, it will be understood that the present invention is not limited to the above-described embodiment, and various modifications in design may be made without departing from the scope of the invention defined in claims.

For example, the application of the feed screw mechanism according to the present invention is not limited to the toe control actuator 14 described in the embodiment, and the feed screw mechanism according to the present invention can be utilized to any application.

In addition, in the embodiment, the internally threaded member 96 is fixed to the output rod 33 by the threadedly coupling portion 97, but any means such as a pin and a recess-projection engagement can be employed in place of the threadedly coupling portion 97.

What is claimed is:

1. A feed screw mechanism in which an internally threaded member fixed within an output rod is threadedly engaged with an externally threaded member, and said externally threaded member is operatively connected to a drive source at a first axial end of said feed screw mechanism, so that said output rod is moveable relative to said externally threaded member by rotating said externally threaded member relative to said internally threaded member, wherein said internally threaded member is coupled to said output rod by a coupling portion provided on said internally threaded member at a second axial end of said feed screw mechanism spaced apart from said first axial end of said feed screw mechanism, and wherein said internally threaded member is restrained in said output rod by a restraining portion formed on said output rod, said restraining portion disposed adjacent a portion of said internally threaded member proximate the second axial end of the feed screw mechanism.

2. A feed screw mechanism according to claim 1, wherein said coupling portion is formed by threadedly meshing external threads formed on an outer periphery of said internally threaded member with internal threads formed on an inner periphery of said output rod.

3. A feed screw mechanism according to claim 2, wherein a clip for preventing the loosening of said internally threaded member is mounted between said externally threaded member and said output rod at said first axial end of said feed screw mechanism.

4. A feed screw mechanism according to claim 1, wherein a first end of the externally threaded member which is located at said first axial end of the feed screw mechanism is configured such that said first end penetrates a central portion of an input flange.

5. A feed screw mechanism according to claim 4, wherein said first end of the externally threaded member is reduced in diameter and has additional threads thereon such that it may be engaged by a nut located axially behind said input flange.

6. A feed screw mechanism according to claim 1, wherein said internally threaded member is entirely disposed in said output rod, and wherein said coupling portion is provided on only a section of said internally threaded member which is proximate said second axial end of said feed screw mechanism.

7. A feed screw mechanism comprising:
a hollow output rod;
an internally threaded member which is entirely disposed within said output rod, wherein said internally threaded member is coupled to said output rod by a coupling portion provided on said internally threaded member at a first axial end thereof;
an externally threaded member which is threadably received in said internally threaded member, said externally threaded member comprising a reduced diameter portion which is operatively connected to a drive source at an end thereof which is spaced away from said first axial end of said internally threaded member, a tip end of said reduced diameter portion having exterior threads formed thereon;
a substantially disk-shaped input flange having a hole formed centrally therein which receives the reduced diameter portion of the externally threaded member therethrough; and
a nut which fits on said tip end of the externally threaded member;
wherein said feed screw mechanism is configured and arranged so that said output rod is linearly movable relative to said externally threaded member by rotating said externally threaded member in said internally threaded member.

* * * * *